United States Patent [19]
Breton et al.

[11] Patent Number: 5,912,036
[45] Date of Patent: *Jun. 15, 1999

[54] PROCESS FOR PRODUCING DAIRY PRODUCTS

[75] Inventors: Christian Breton, Montfaucon sur Moine; Patrick Sauvion, Montigne sur Moine; Bernard Spiess, Montfaucon sur Moine; André Dauloudet, Niafles, all of France

[73] Assignee: Celia, Craon, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,717
[22] PCT Filed: Nov. 2, 1994
[86] PCT No.: PCT/FR94/01271
  § 371 Date: Jun. 12, 1996
  § 102(e) Date: Jun. 12, 1996
[87] PCT Pub. No.: WO95/12321
  PCT Pub. Date: May 11, 1995

[30] Foreign Application Priority Data

Nov. 3, 1993 [FR] France ................................. 93 13071

[51] Int. Cl.⁶ .............................. A23B 55/00; A23L 1/05; A23C 9/12; A23C 19/00
[52] U.S. Cl. ................... 426/319; 426/580; 426/582; 426/573; 426/36; 426/516; 426/519
[58] Field of Search .............................. 426/40, 36, 319, 426/34, 39, 516, 582, 491, 330.2, 519; 99/453, 458, 461, 452–455, 465, 467, 470

[56] References Cited

U.S. PATENT DOCUMENTS

| | | | |
|---|---|---|---|
| 4,205,090 | 5/1980 | Maubois et al. | 426/40 |
| 4,224,865 | 9/1980 | Grosclaude et al. | 99/453 |
| 4,756,243 | 7/1988 | Radford et al. | 99/453 |
| 4,965,078 | 10/1990 | Van Leeuwen et al. | 424/40 |

*Primary Examiner*—Lynette F. Smith
*Assistant Examiner*—Datquan Lee
*Attorney, Agent, or Firm*—Pollock, Vande Sande & Amernick

[57] ABSTRACT

Process for the production of dairy products comprising at least one ultrafiltration (1) and maturation (2) stage, is characterized in that it comprises at least one stage for placing the said product under pressure downstream of a homogenization stage (4), followed by at least one distribution stage which makes it possible to obtain the passage of the product from a liquid phase to a solid phase, and then at least one expansion (16) or decompression stage for the forming, and finally, at least one stage for cutting the said solid product into portions.

12 Claims, 5 Drawing Sheets

PROCESS FOR PRODUCING DAIRY PRODUCTS

FIELD OF THE INVENTION

The present invention relates to a process for the processing of milk and of dairy by-products. It relates more particularly to a process which makes it possible to obtain, from a retentate from the ultrafiltration of milk possibly comprising enzymatic or chemical agents, but acidified by thermophilic and/or mesophilic lactic acid bacteria, the passage from a liquid state to a solid "cheese" state, which can be handled and sliced, capable of starting the brining and ripening cycle.

BRIEF DESCRIPTION OF THE PRIOR ART

The known processes for the manufacture of a cheese use a succession of stages such as especially the formation of a milk gel by lactic and/or enzymatic acidification, the shaping of the curd in moulds, the draining and/or the pressing of the curd so as to enhance its cohesion as a block representing the size of the cheese, the run-off of the whey, the removal of the cheese from moulds, and then the salting followed by the ripening phase. These processes are carried out using techniques which make it possible to obtain liquid precheeses or retentates by ultrafiltration, containing most of the whey proteins (see French Patent No. 2,052,121), and they permit high cheese yields (continuous production of a retentate) which lead to savings on rennet. Nevertheless, given that the phenomenon of syneresis—which is an agglomeration, over time, of particles in a gel—is practically absent in the liquid precheese, the use of rennet or of an enzymatic agent for lactic or acid coagulation is not completely abolished, which necessarily involves the intermediate use of moulds to place the curd therein.

The production of cheeses requires the immobilization of a large number of moulds for a long period of time, generating moreover considerable maintenance and handling operations (removal from moulds, washing, pressing and the like).

Products obtained by the implementation of processes based on the application of shear forces to an ultrafiltration retentate and the use of the texture modification resulting from it, are moreover known (cf. German Patent No. 2430199 and French Patent No. 2,589,331). In general, these coagulation processes are applied to liquid products, especially drinks or fresh pastes.

SUMMARY OF THE INVENTION

The present invention aims to overcome the preceding disadvantages, by proposing a process which makes it possible to obtain, from a retentate derived from ultrafiltration, a product, especially a cheese, without necessitating the addition of a coagulating agent for the passage from the liquid state to the solid state and therefore capable of undergoing the following stages of production of the finished product.

The present invention proposes, in particular, the use of the phenomenon of texture modification which a dairy product undergoes, under given physicochemical conditions, when shearing stresses are applied to it. Thus, the liquid precheese passes from a liquid state to a solid state which can be sliced and handled.

Advantageously, the process which is the subject of the invention dispenses:

with the possible placing of the liquid retentate in contact with rennet for the formation of curd;

with the use of moulds;

and permits:

the formation of a finished product capable of being subjected to salting continuously and instantly;

the production of cheese of variable size and shape;

the overrun and/or the addition of markers or flavourings;

the injection of filling products continuously or discontinuously.

To this end, the process for the production of dairy products comprising at least one ultrafiltration and maturation stage, is characterized in that it comprises at least one stage for placing the said product under pressure downstream of a homogenization stage, followed by at least one distribution stage which makes it possible to obtain the passage of the product from a liquid phase to a solid phase, and then at least one expansion or decompression stage for the forming, and finally, at least one stage for cutting the said solid product into portions.

Other characteristics and advantages of the present invention will emerge from the description made below, with reference to the accompanying drawings which illustrate an exemplary embodiment thereof, with no limitation being implied. In the figures:

DETAILED DESCRIPTION OF THE INVENTION

Figure 1:
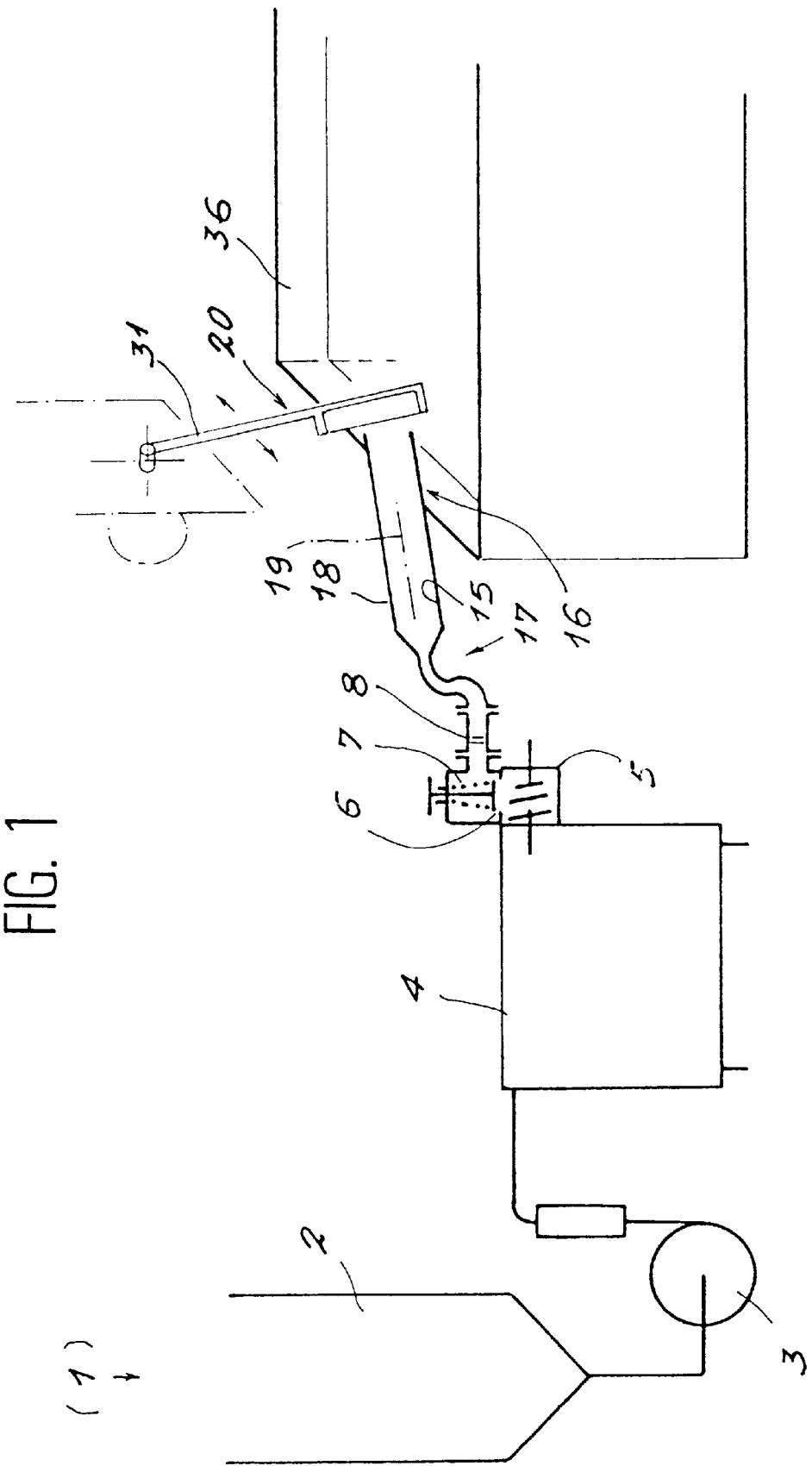
FIG. 1 illustrates a plant for implementing the process according to the invention, comprising mainly a maturation unit, a homogenization unit, a hardening and gel shaping unit, a cutting unit and a salting unit.
Figure 2:
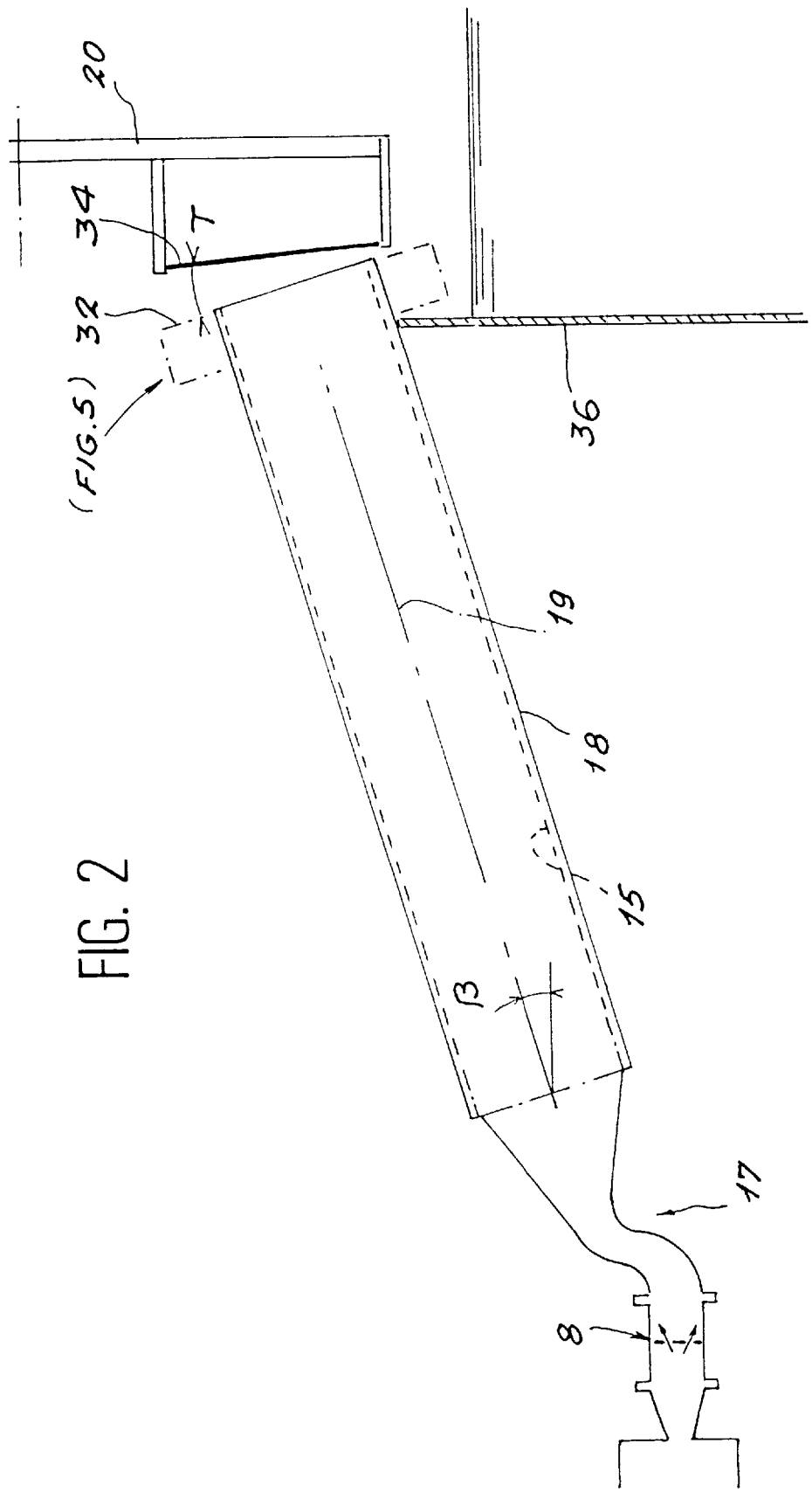
FIG. 2 is a sectional plane view of the hardening and gel shaping unit.
Figure 3:
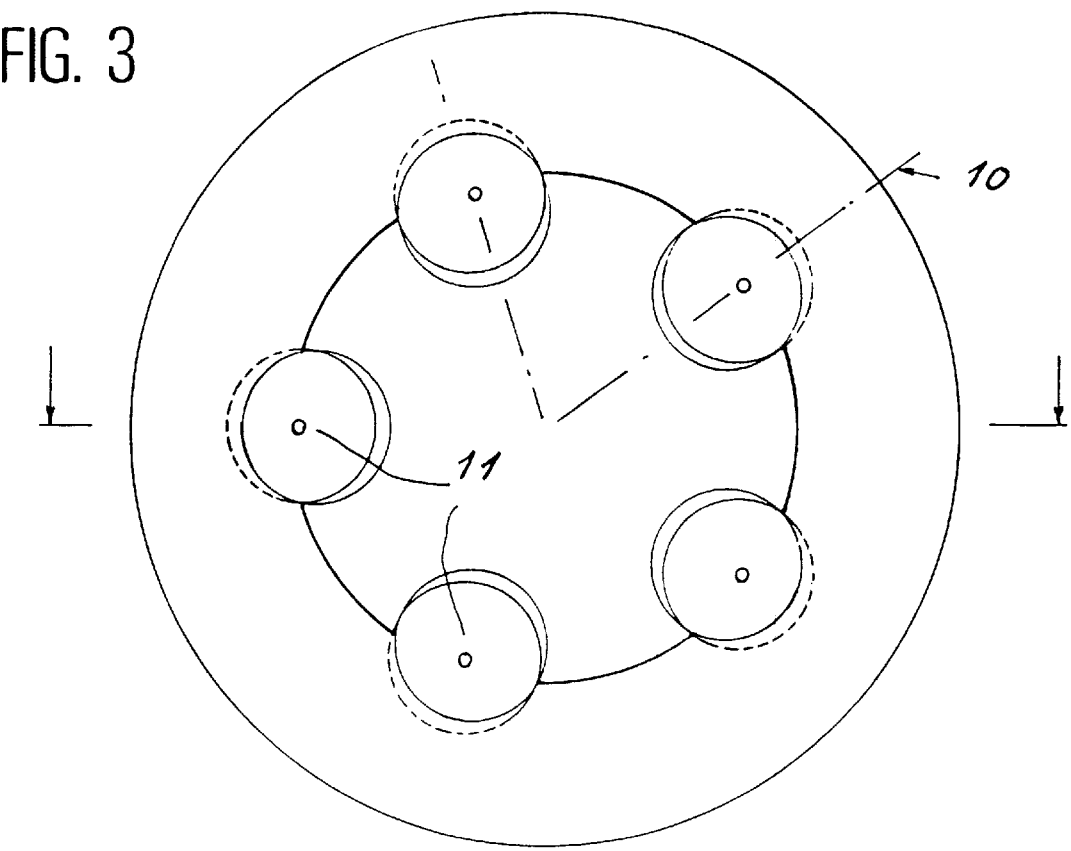
FIG. 3 is a front sectional plane view of the plate comprising the nozzles or the pellets which bring about the change in phase of the product.
Figure 4:
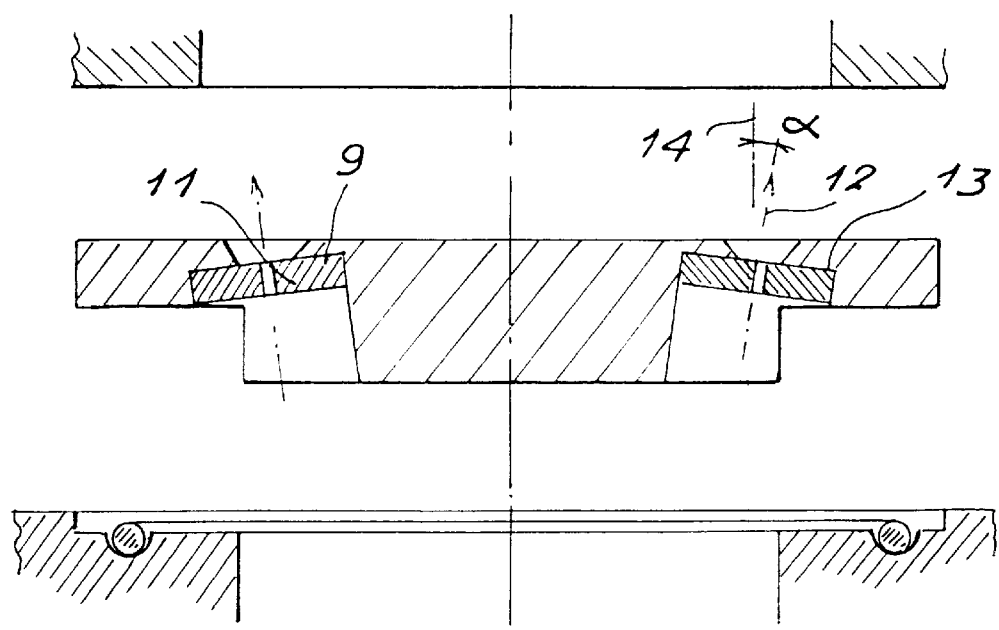
FIG. 4 is a side plane view of the plate provided with pellets.
Figure 5:
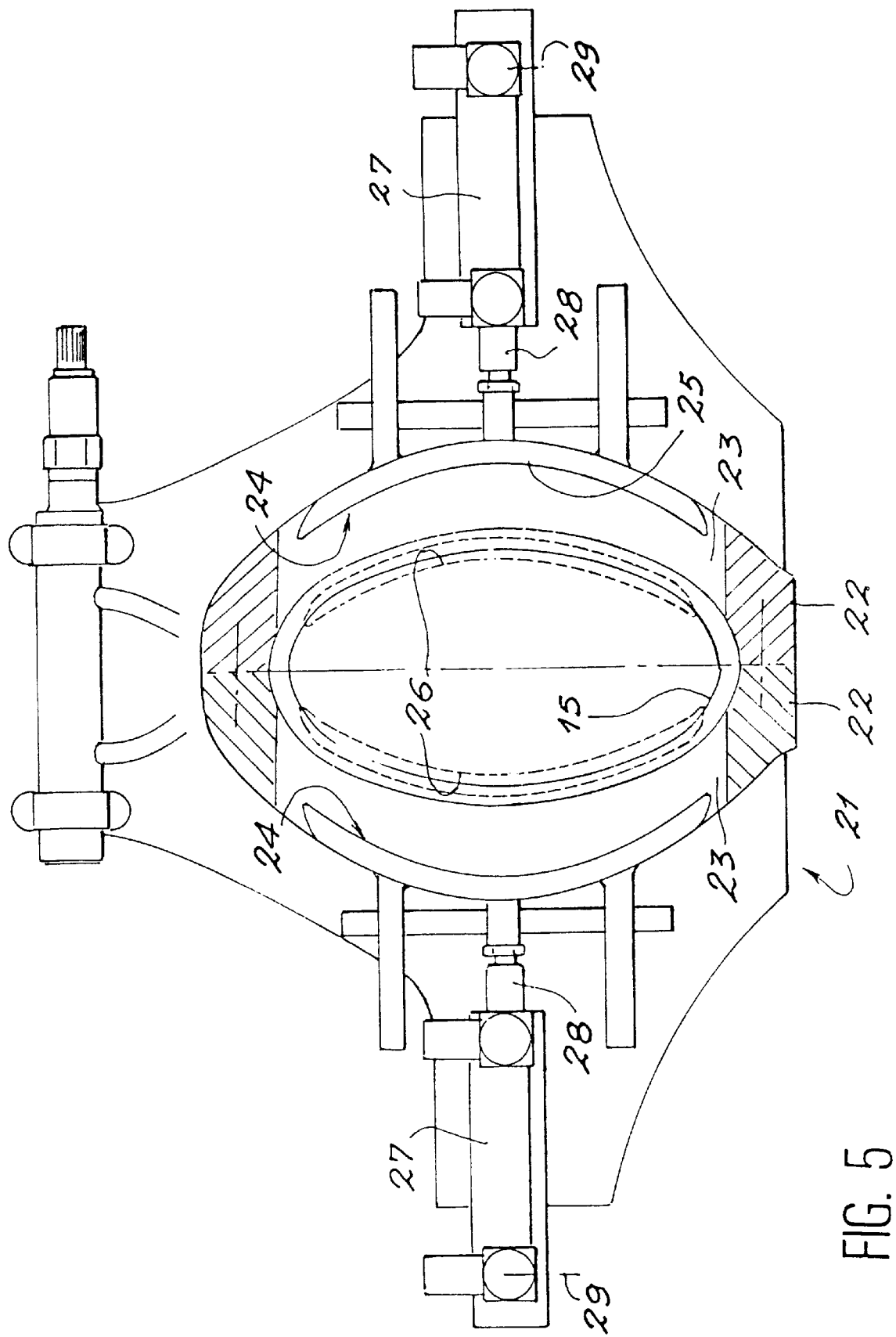
FIG. 5 is a front sectional plane view of the preforming unit provided with marking jaws.
Figure 6:
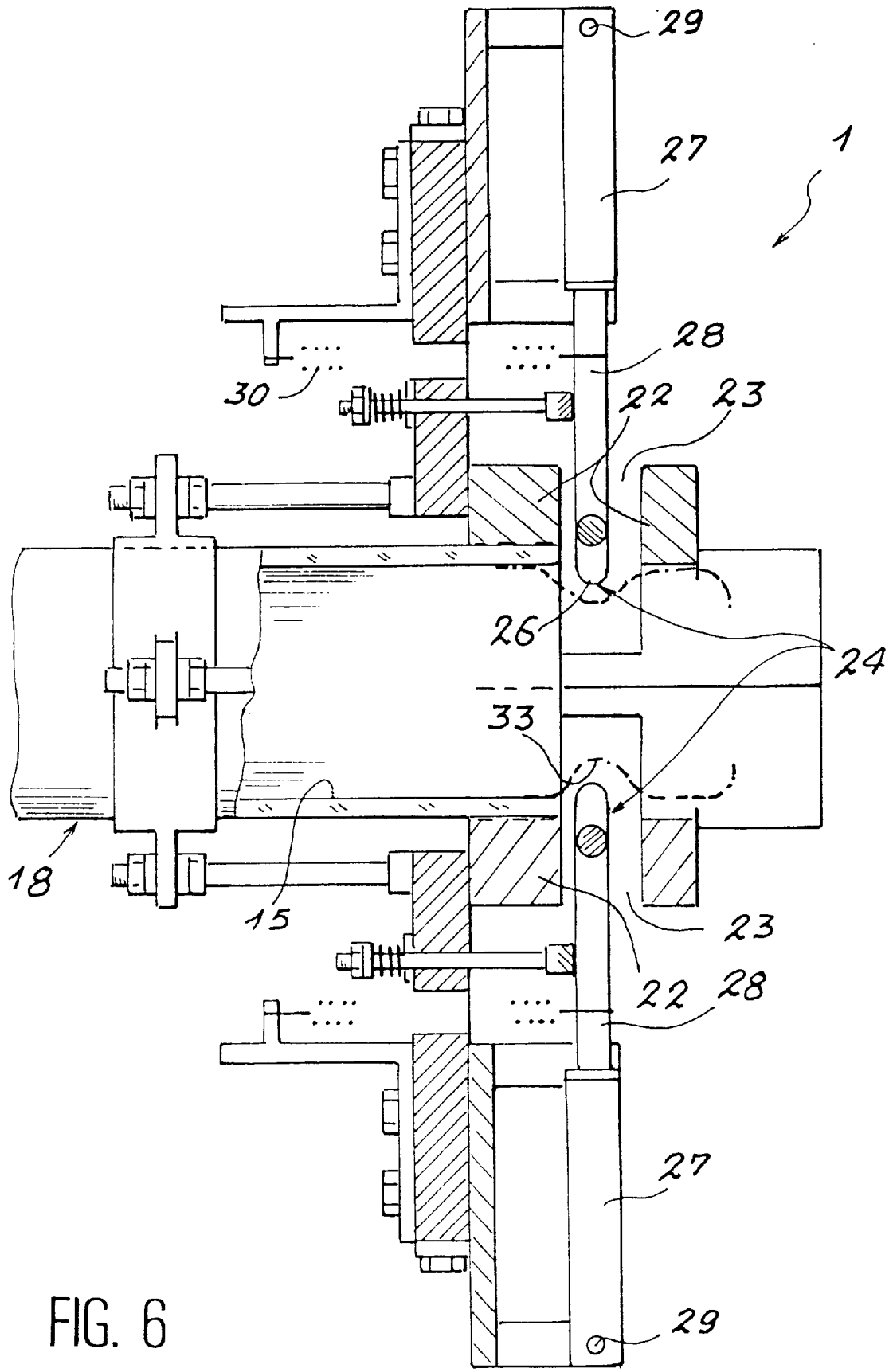
FIG. 6 is a sectional top view of the preforming unit provided with marking jaws.

According to a preferred embodiment of the process according to the invention, it comprises a succession of stages which makes it possible to obtain, from a liquid retentate derived from an ultrafiltration unit 1, solid portions of products, especially cheese products.

The liquid retentate from the ultrafiltration enters a maturation reservoir 2 in which it is optionally subjected to acidification by thermophilic and/or mesophilic lactic acid bacteria, then it is adjusted, under requisite physicochemical conditions, especially by the choice of cooling and pH conditions, to characteristics appropriate for its moulding. By way of example, there may be mentioned especially for a dairy product comprising thermophilic lactic acid bacteria, a cooling temperature very close to 45° C. but not less than 36° C., and a pH value between the range of 5.00 and 5.90.

On leaving the maturation reservoir 2, the liquid retentate is taken by a booster pump 3, in the direction of a homogenization unit 4, especially incorporating two heads 5, which raises the pressure of the product.

During this homogenization stage 4, there is at least one pressurizing stage which forces the liquid product into at least one decompressing component 6, especially of the valve type, this component being adjusted by a system of adjustable springs 7.

Within the pressurizing stage, the retentate has a mean pressure which is close to 300 bar and it passes through a component 8 which is made in the form of a plate, provided with a plurality of orifices 9 which allow the change in phase of the retentate or liquid precheese into a cheese gel. The plate incorporates a plurality of orifices 9 arranged so as to form equal sectors 10 on a generator (especially a diameter) for a circular plate 8, the said orifices 9 are filled with a plurality of nozzles 11 or pellets, especially five, made from tungsten carbide. Provision is optionally made to place at the level of the plate 8 a plurality of orifices allowing the passage of various components, added by pumping, and which will be carried by turbulence into the cheese paste.

According to an advantageous characteristic, the axis 12, perpendicular to the plane of the seat 13 of each of the orifices 9 receiving the pellets 11 is inclined by an angle $\alpha$ of a few degrees, between 5 and 20° and preferably 13°, relative to the axis of the orifice 14. This arrangement makes it possible on the one hand to create divergent jets in the direction of the internal walls 15, and on the other hand to ensure that the speed profile of the cheese gel is flat, the shape of the speed profile being critical for good distribution of the product and for the desired firmness of the cheese gel.

Downstream of this processing stage, there is at least one stage for expansion 16 or decompression of the gel and for forming into a roll. These phases are carried out through a plurality of bends 17, of which at least one diverges and enters a tubular portion 18 having sections of any type. The inner walls 15 of the tube possess advantageous surface properties, especially at the level of their surface state, with respect to the cheese gel which is in contact; thus, this tube 18 is made from a plastic material especially of the polymethyl-methacrylic (P.M.M.A) type whose slippage properties are important. Moreover, it is advantageous to incline by a few degrees, with an angle $\beta$ of between 5 and 30°, and preferably 15°, the longitudinal axis of the tube 19 relative to the horizontal. This conformation creates, on the one hand, a sufficient head loss in the tube to ensure that it is continuously filled, and on the other hand, conditions which facilitate the subsequent cutting of the roll into portions. The expansion tube brings about the conversion of the gel into a homogeneous and thick paste free of liquid extract, whose texture is that of the final product.

The firmness of this texture on leaving the nozzle can be measured by the following technique:

A piece of cheese is inserted into a support defined in the DIN 10 331 standard. A perfectly flat length of 25 mm is presented in the form of a string of diameter 0.3 mm driven at a downward speed of 0.1 mm/s. The temperature of the sample is 15° C. The force necessary to ensure the penetration of the string into the cheese sample is measured by an appropriate device, the speed of penetration being constant.

Thus, the following values for the penetration force were recorded for cheeses obtained according to the process which is the subject of the invention: from 0.2 to 2.2 Newton. These values are to be compared with those obtained for fresh paste-type cheeses: 0.04 to 0.1 Newton.

The final stage consists in cutting the roll into portions with the aid of the action of at least one slicing component 20, such as especially a wire or a plastic string, combined with that of at least one forming component 21 and a marking component. On leaving the tube, the roll of cheese paste which comes out continuously by the continuous action of the pressurizing means 4, travels through a forming component 21, provided with shells 22 whose shape is chosen so as to maintain the conformation of the roll in the size determined by the user. Thus, in order to obtain oval portions, the shells 22 comprise especially a concave shape in their zone of contact with the roll.

According to another embodiment, the shells 22 are rectilinear shapes for a roll comprising flat walls.

In these shells 22, there is arranged, in cavities 23, a plurality of jaws 24 carrying a protuberance 25 whose shape is similar to the shape of the shell 22 and projecting in the direction of the roll, intended to make a hollow imprint 26 in the circulating product.

These jaws 24 are actuated translationally in the direction of the walls of the roll, by a plurality of operating means 27 such as pneumatic jacks. Each of the jacks has a point 29 for anchoring to the fixed frame of the machine, each of the free ends of the jack rod 28 is integrally attached to the respective jaws 24. The hinge point 29, especially of the ball-and-socket type, permits the combination of axial and radial movements of the jaws 24, when the latter grip the walls of the roll.

The kinematics of the jaws 24 can be broken down in the following manner:

a radial translation towards the walls of the roll, until a hollow imprint is marked on the circulating product;

given that the roll advances continuously towards the outlet of the shells 22, it causes axial translation of the jaws 24;

release of the jaws 24 and return, especially by a return spring system 30, to their original plane for another cycle, the movement thus created resembles a pilgrim step.

The slicing component 20, such as especially a wire tied to an oscillating arm 31, sweeps in a continuous reciprocating movement, at a rate determined by the user and in phase with the kinematics of the jaws 24, the front wall 32 of the shells 22 at the level of the median zone 33 left by the imprint 26 of each of the jaws 24.

According to another characteristic of the invention, the sectional plane 34 is inclined at an angle $\tau$ of a few degrees relative to the outlet plane 32, between 5 and 20°, and preferably 8 to 12° so as to compensate for, the deformation of the gel which is no longer supported by the tube, the dry extract composition of the retentate.

The process which is the subject of the invention is advantageously controlled by an automatic control system 35 (not represented in the figures) based on computers and programmable logic units, in order to be able to control automatically, at the level of the machine running times, the movement of the slicing component 20.

According to one embodiment of this process, the latter allows the appearance, in the liquid retentate, of an overrun by incorporation of a gaseous fluid, especially carbon dioxide or nitrogen. It is also possible to incorporate into the liquid precheese or into the gel, a taste-enhancing, texturing or filling agent, optionally of non-dairy origin, the distribution of the incorporated products taking place homogeneously and uniformly.

The process which is the subject of the invention ensures moreover that most of the liquid concentrate derived from the ultrafiltration unit 1 is converted, after its passage through the plate 8 provided with nozzles 11 or pellets, into a curd of texture ranging from a pasty state to a firm state similar to the paste, whose characteristics satisfy for example the DIN 10 331 standard, depending on the operating parameters. Moreover, there is no exudation of whey in this process, causing a significant improvement in the yield by retaining virtually all the soluble proteins in the curd.

As a major advantage, there should also be noted the total absence of draining after cutting, resulting in a reduction in the loss of material in the cut products.

Given the interchangeability of the forming tube 21 and the shells 22, it is possible to change, within a very short period of time, the shape, mass, composition and consistency characteristics, and the like, of the products derived from this manufacturing process, and to increase the quantities produced by a multiplication of plants using the process downstream of an ultrafiltration unit 1 and upstream of a salting unit 36.

Thus, according to another embodiment of the process which is the subject of the invention, the forming tube 21 is elongated and equipped with a jacket allowing the passage of a liquid coolant, ensuring the heating or cooling of the paste.

Given that it is also not essential to incorporate rennet into the retentate or the liquid precheese for its coagulation, there is no longer any risk of observing the phenomenon of "lubrication" of the rind, a phenomenon which is practically always observed in the case of the coagulation of an ultrafiltered concentrate comprising rennet.

It is of course still the case that the present invention is not limited to the exemplary embodiments described and represented above, but it encompasses all the variants thereof.

What is claimed is:

1. A process for the production of cheese comprising the steps:

subjecting milk to ultrafiltration to produce liquid retentate;

subjecting the retentate to maturation;

subjecting the matured retentate to homogenization;

pressurizing the homogenized retentate;

passing the homogenized liquid retentate along a liquid flow path;

at a transverse boundary along the flow path, subjecting the pressurized liquid retentate to a plurality of orifices that have their respective axes angularly offset relative to the direction of the flow path;

emitting jets from the orifices that diverge relative to the direction of the flow path, as a result of the angular offset, for immediately converting the phase of the liquid retentate to a coagulated cheese gel, without the presence of a coagulating agent;

decompressing the gel at outlets of the orifices;

expanding the cheese gel in a fixed volume tube to cause further conversion of the gel to a homogeneous thickened paste that is substantially free of liquid; and slicing the paste, having a final desired consistency, upon exit from the fixed volume tube.

2. The process according to claim 1 including the step of subjecting the liquid retentate to a preselected gas that is incorporated into the liquid retentate for allowing the appearance of an overrun in the liquid retentate.

3. The process according to claim 1 further comprising the step of adding an agent to the retentate, the agent selected from the group consisting of a taste-enhancing, texturing and filling agent.

4. The process according to claim 1 together with the step of molding the sliced paste.

5. The process according to claim 1 wherein the orifices are formed in a plate that intercepts the flow of pressurized liquid retentate.

6. The process according to claim 1 together with the step of pumping preselected ingredients into the pressurized liquid retentate where it encounters turbulence and is mixed homogeneously into the cheese paste.

7. The process according to claim 1, wherein the tube is made from polymethyl-methacrylic (P.M.M.A.) plastic having a surface texture on the inner wall thereof that controls slippage of the cheese gel.

8. The process according to claim 1 wherein the tube is externally subjected to a temperature variation for ensuring heating or cooling of the paste as governed by an automated system.

9. The process according to claim 1, wherein a longitudinal axis of the tube is inclined, by an angle $\beta$ of between 5 and 30° relative to the horizontal.

10. The process according to claim 4 wherein molding occurs by shells that are driven by reciprocating members, to encounter the slices in a direction perpendicular to slice movement, with surfaces of preselected shape, followed by the molding then release thereof.

11. The process according to claim 10, wherein the reciprocating members are actuated translationally in the direction of slice movement.

12. The process according to claim 5 wherein an axis of each orifice is inclined at an angle $\alpha$, between 5 and 20° relative to an axis of the plate.

* * * * *